United States Patent

[11] 3,598,385

| [72] | Inventor | Charles F. Parsons, Jr.<br>520 Brierhill Road, Deerfield, Ill. 60015 |
|---|---|---|
| [21] | Appl. No. | 811,130 |
| [22] | Filed | Mar. 27, 1969 |
| [45] | Patented | Aug. 10, 1971 |

[54] VEHICLE WHEEL SUSPENSION SYSTEM
3 Claims, 4 Drawing Figs.

[52] U.S. Cl............................................................ 267/20 A,
180/73 R, 280/96.2 R, 280/112 A, 280/124 A
[51] Int. Cl...................................................... B60g 3/18,
B60g 3/26
[50] Field of Search........................................... 280/124.1,
124, 112.1, 112; 267/15, 20, 20 A

[56] References Cited
UNITED STATES PATENTS

| 862,556 | 8/1907 | Handy | 267/20 A |
|---|---|---|---|
| 2,643,897 | 6/1953 | Chowning | 280/112 |

*Primary Examiner*—A. Harry Levy
*Attorney*—Bacon & Thomas

ABSTRACT: Independently mounted wheel supports on opposite sides of a vehicle are each mounted by a pair of upper and lower links. Corresponding main links of each pair are pivoted on a single common axis on the vehicle. The other link of each pair is pivoted to the main link of the opposite pair, at a point vertically displaced from said common axis, to hold the wheels parallel and coaxial at all times with their camber unaffected by lateral forces on the vehicle. The system is equally applicable to steerable or driven wheels.

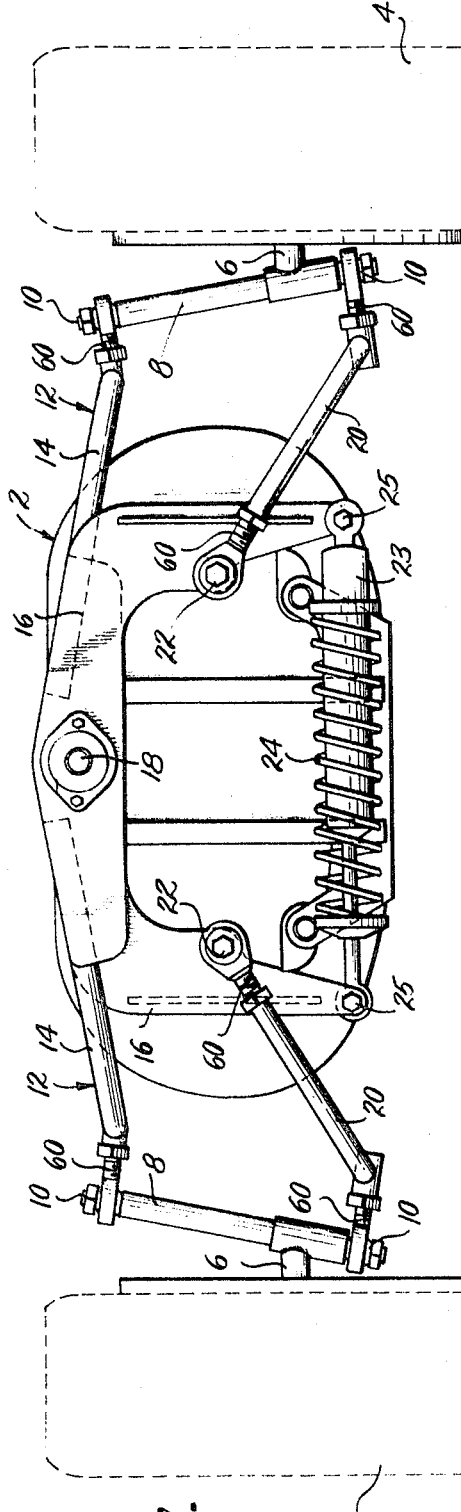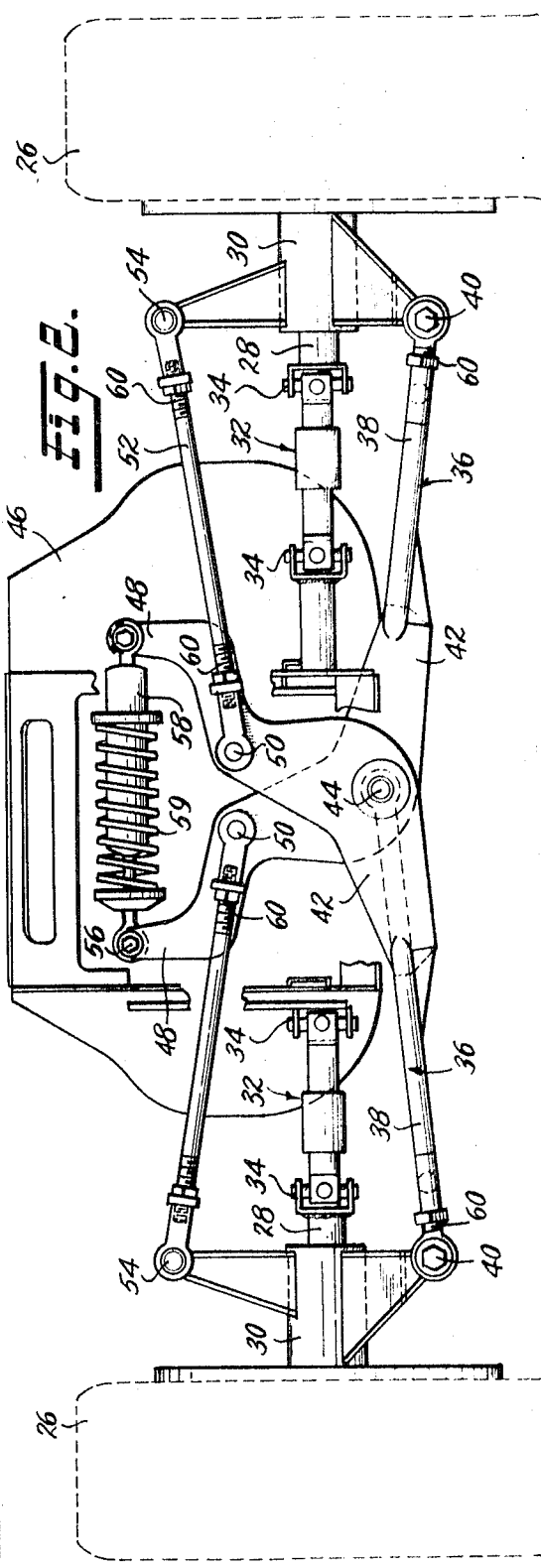

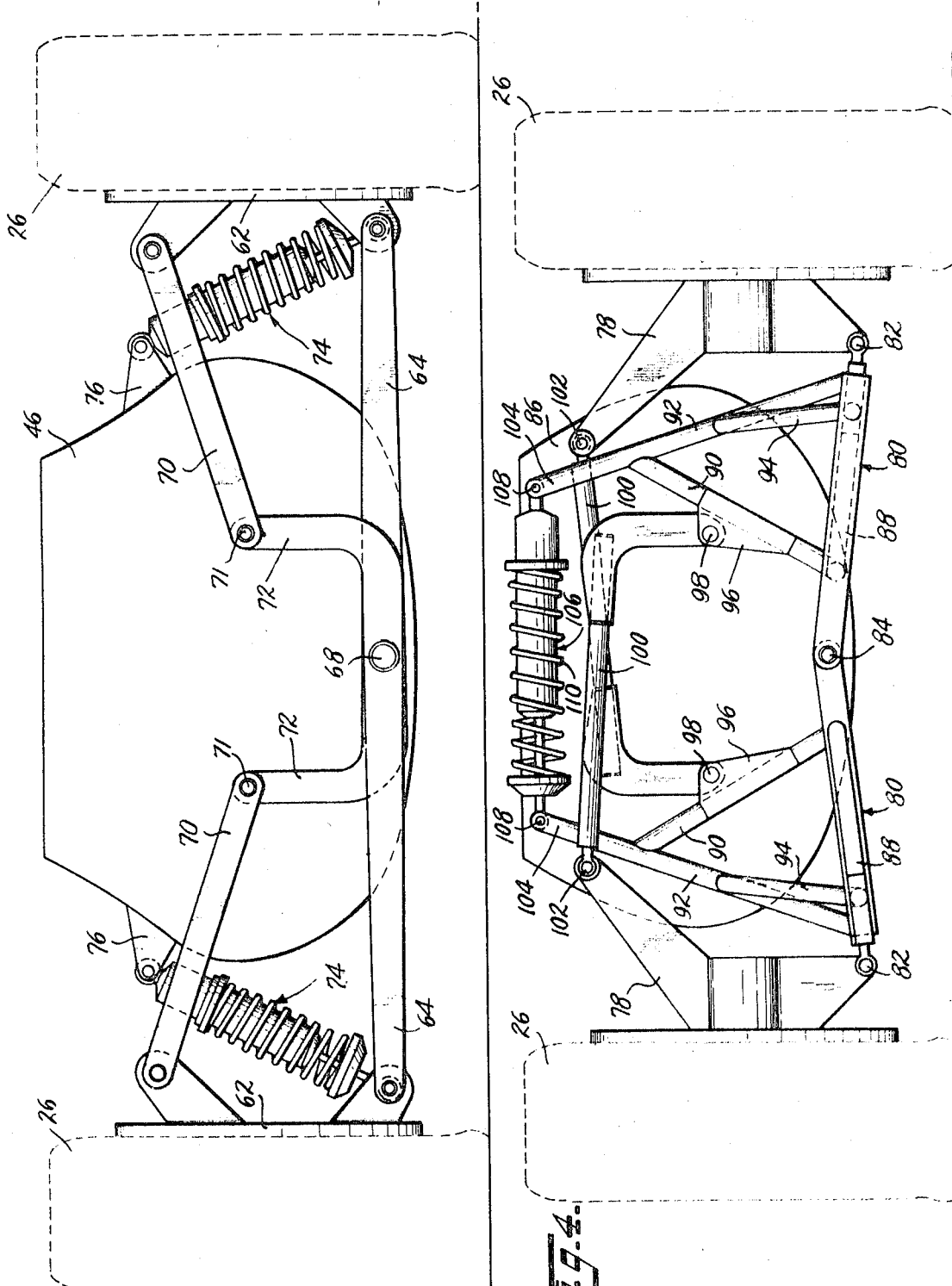

VEHICLE WHEEL SUSPENSION SYSTEM

BACKGROUND OF THE INVENTION

This invention relates to vehicle wheel suspension systems and is particularly useful in racing automobiles.

Present day independent wheel suspension systems as commonly used on commercial and racing automobiles were developed for the purpose of providing a softer ride in the vehicle. Such systems conventionally comprise a wheel-mounting assembly that is connected to the vehicle at vertically separated fixed pivot locations. With such systems two major drawbacks are present. Lateral forces on the vehicle result in a "jacking" effect, which tends to lift the vehicle and thus tilt the wheels even though they remain on the ground. Furthermore, this lifting of the vehicle itself by a lateral force detracts from the softness and smoothness of the ride produced. In an effort to overcome this effect, manufacturers have resorted to antiroll bars usually comprising a torsion bar connected to both wheel supports and which, in large part, detract from the contemplated softness of the ride provided by independent wheel mounts. The antiroll bar tends to cause both wheels to move upwardly when one of them bounces over a bump and thus reduce the traction between the road and the wheel remaining on the ground.

A further disadvantage of contemporary suspension systems is apparent on turning corners and particularly at relatively high speeds. The large lateral forces cause the body of the vehicle to roll which in turn causes a tilting of the wheels, which again results in less soft springing and results in unwanted wheel tilt. The antiroll bars employed counter this effect to some degree but the wheels are then no longer really independent.

As stated before, any movement of the wheels relative to the vehicle in the present systems causes relative tilting between the wheels themselves whereby they are no longer parallel or perpendicular to the road surface an this results in a further disadvantage, particularly in view of recent developments in tires. Recently developed tires, particularly for racing cars, have very low profile with a tread surface that is very wide when inflated and often is as wide as 15 inches. Obviously, it is essential that the entire tread width of such a tire be in contact with the road surface to achieve the maximum advantage from such development. In conventional suspension systems, any functioning of the suspension links results in the two wheels moving out of parallelism so that it is then impossible for both treads to be in full width contact with the road surface and the advantages of the newly developed tires are thereby lost.

SUMMARY OF THE INVENTION

The present invention comprises an independent wheel suspension system wherein each of the disadvantages noted above has been overcome. Basically, the system comprises wheel supporting structures having inwardly extending upper and lower links, one of which is termed a major link. The major links from both sides of the vehicle are pivoted to the vehicle frame about a common fore-and-aft axis and the other link of each pair is pivoted to the major link of the opposite pair at a point vertically displaced from the common axis referred to. The links are so proportioned and dimensioned that the wheels are at all times parallel to each other and also coaxial to each other whereby they may both contact the road surface over the full width of their treads while being truly independently suspended from the vehicle. Since the entire suspension system is connected to the vehicle only about a single common axis, obviously lateral forces on the vehicle will not cause any actuation of the suspension links.

Reference herein to wheels being "parallel" is intended to include the condition wherein the wheels are purposely mounted with a small angle of camber, as is common.

Several different springing arrangements are possible and will be disclosed in greater detail in the following description.

BRIEF DESCRIPTION OF THE DRAWINGS

FIG. 1 is an end view of a front wheel suspension system embodying the present invention;

FIG. 2 is a rear view of a vehicle showing the driving wheels suspended by a system embodying the present invention;

FIG. 3 is a schematic view of a wheel suspension system illustrating a different springing arrangement; and FIG. 4 is a schematic view similar to FIG. 2 but illustrating a different manner of springing the system.

DESCRIPTION OF THE PREFERRED EMBODIMENTS

Referring first to FIG. 1, numeral 2 indicates a vehicle body and the illustration is intended to represent a relatively rigid structure comprising a chassis frame and body. Herein the use of the term "frame" is intended to include the conventional chassis of an automobile, the body thereof, and/or any additional supports rigidly fixed thereto for purpose of accommodating the present suspension system.

The vehicle shown in FIG. 1 is provided with wheels 4 journaled on suitable steerable axles 6 carried by king pin devices 8. The upper end of each king pin device 8 is provided with a ball-type joint 10 about which a major link 12 is universally pivoted. Each major link 12 is shown as comprising a first link portion 14 rigidly secured to an L-shaped rigid member 16, which extends inwardly past the center of the vehicle, then downwardly, as shown. Each of the rigid members 16 is pivotally journaled about a common axis at 18, which axis is preferably located centrally of the vehicle and extends in a fore-and-aft direction. The members 16 are independently pivotally movable about the axis 18.

The lower ends of the king pin devices 8 are also provided with ball joints 10 on which lower links 20 are universally pivotable. At its inner end each link 20 is pivoted to the depending portion of member 16 comprising a part of the major link for the opposite wheel. Such pivot points are shown at 22 and are, in this embodiment, located a substantial distance below the central common axis 18.

As will be obvious, either wheel may move upwardly as a result of hitting a bump in the road or otherwise and in doing so, its major link 14 swings upwardly about the axis 18 and thereby swings the pivot 22 carried thereby in a downward and inward direction without either lifting the vehicle body or tilting the same. In moving upwardly, the wheel will also tilt slightly to swing its top inwardly and, due to the transfer of motion to the lower link of the opposite wheel, that wheel will likewise be tilted in the same direction and through the same amount while the two wheels remain coaxial. Obviously, the weight of the vehicle on pivot 18 will cause the raised wheel to move downwardly to the road surface so that both wheels contact the road throughout the full width of their treads. Furthermore, upward bouncing movement of one wheel actually transfers more weight to the other wheel, thus increasing its tractive effect on the road.

It is also apparent that movement of the vehicle around a corner or curve, even at high speeds, will result in lateral forces on the vehicle body, tending to tilt the same about pivot 18, without in any way causing movement of the wheel suspension linkage and thus the wheels remain flat on the road during all cornering movements.

In the embodiment shown in FIG. 1, it will be necessary to provide some means for controlling roll of the vehicle body 2 while cornering although the weight of the vehicle is suspended below the axis 18 and acts as a pendulum.

If the center of mass is properly positioned, roll of the vehicle on cornering can be controlled. It is contemplated that suitable spring devices will be employed to control such roll but they constitute no part of the present invention and are not shown herein.

The depending portions of major links 14, on which the pivot 22 are mounted, extend downwardly from those pivots and their lower ends are pivotally joined, by pivot means at 25, by a suitable springing device comprising a compression spring 24 and a shock absorber 23 of known construction. The shock absorber-spring assembly is pivotally connected to the lower ends of the major links, as at 25, and it will be apparent that the spring 24 comprises a spring suspension system for the vehicle adapted to resiliently support the vertical thrust thereof without in any way restraining roll of the vehicle and without imparting any vehicle-lifting forces therethrough in the event one of the wheels bounces upwardly over a bump in the road.

FIG. 2 illustrates a second embodiment of the invention, but it exhibits the same basic features as the embodiment just described. In FIG. 2, the wheels 26 are mounted on stub axles 28 drivingly connected to the wheels and journaled in a wheel support structure 30. Numerals 32 identify schematically illustrated drive shafts extending outwardly to the stub shafts 28 and which are drivingly connected to a suitable differential or other drive means (not shown). The drive shafts 32 are provided with the conventional universal joints 34 to permit independent vertical movement of the wheels 26 while still providing for positive drive to the wheels.

In this embodiment the lower link 36 of each pair is the major link, each of which comprises a first rod member 38 pivoted to a lower portion of the wheel support structure 30, only about a fore-and-aft pivot axis 40. Each of the rods 38 is rigidly fixed to a rigid link member 42 of generally the shape shown in FIG. 2 and both of the members 42 are journaled about a central, fore-and-aft, common axis defined by pivot 44 fixed relative to the vehicle frame 46. As shown, each of the major link members 42 extends upwardly from pivot 44, then outwardly, then again upwardly, terminating in upper end portion 48. Intermediate the pivot axis 44 and the upper ends 48 each link member 42 is provided with a pivot 50 on which the inner end of an upper link 52 is journaled. Each upper link 52 is pivotally connected at its outer end, about a fore-and-aft axis 54, to an upper portion of the adjacent wheel supporting structure 30. As shown, the upper links 52 are pivotally connected to the major links at an elevation above the major axis 44.

The upper end portions 48 of the major links 36 are pivotally connected, at 56, to opposite ends of a shock absorber-spring assembly 58, which may be considered to be substantially identical to that shown in FIG. 1 except that in this instance, the spring 59 is a tension spring rather than a compression spring. It will be obvious that, in the arrangement of FIG. 2, the weight of the vehicle bearing on axis 44 will be resisted by tension of the spring 59 tending to draw the upper ends 48 toward each other. It is to be further noted that both the compression spring of FIG. 1 and the tension spring of FIG. 2 tend to urge the respective wheels downwardly against the road surface.

It will be obvious to those skilled in the art that the suspension system shown in FIG. 2 operates similarly to that of FIG. 1 and provides for maintaining both wheels 26 at all times parallel and coaxial, with the same attendant advantages. However, since the vehicle frame 46 is arranged with its center of mass above the suspension axis 44, the vehicle is not pendulous, and suitable means (not shown) must be provided to control or limit body roll as a result of lateral forces thereon.

In both forms thus far described, either the upper link or the lower link (or both) of each pair is provided with threaded adjustment means, indicated generally at 60 in both Figures, whereby the lengths of the respective links can be adjusted to provide the desired camber to the wheels, if any camber is deemed necessary. Furthermore, these adjustment means provide for initial adjustment to bring corresponding dimensions of each link into exact correspondence with the same dimensions of its opposed link.

FIG. 3 is a highly schematic view of a further embodiment corresponding generally to that shown in FIG. 2. In this Figure, however, many structural features have been eliminated to facilitate the illustration. In FIG. 3, the wheels 26 are mounted on wheel-supporting structures 62, to each of which the major link 64 is pivoted, with the major links journaled on a central pivot 68, corresponding to the pivot 44 of FIG. 2. The upper links 70 of each pair are pivoted, at 71, to upwardly extending portions 72 of the major link of the opposite pair, again similarly to the connections illustrated in FIG. 2, and the outer ends of each link 70 are pivoted to the wheel-supporting structures 62, also as in FIG. 2. In this embodiment, however, the shock absorber-spring assemblies 74 are mounted to extend from the lower portions of the wheel support structure 62 upwardly and inwardly to brackets 76 rigidly fixed to the vehicle frame 46. The spring assemblies 74 thus serve not only to resiliently support the weight of the vehicle but also function to control roll thereof about the axis 68. It will be apparent, however, that any roll of the frame 46 about axis 68 will merely exert downward pressure on the outside wheel assembly without in any way causing relative movement between the suspension links and thus roll will not affect the tilt of the wheels nor their vertical or coaxial relationship. Roll of the body takes place solely about the axis of pivot 68 and exerts no lateral thrust on upper links 70. Clearly, a similar spring suspension means could be provided in the FIG. 1 embodiment wherein the major links 12 are the upper links of each pair.

FIG. 4 is a schematic illustration of a suspension system that is again similar to that of FIG. 2 but modified in certain details. In this form the wheels 26 are carried by wheel supporting structures 78 to the lower portion of each of which a major link 80 is pivoted on fore-and-aft axis 82. The inner ends of the major links 80, are independently pivoted about a fore-and-aft major axis 84 fixed relative to the vehicle frame 86. Each of the major links 80 comprises a rigid assembly of rods or members 88, 90, 92 and 94, all rigidly connected together, such as by welding or the like, to define a rigid link structure. A bracket 96 is rigidly affixed to each rod 90 and each bracket 96 carries a pivot 98 to which the upper link 100 of the opposite pair is connected. Each of the links 100 is of generally L-shape and is connected at its outer end to an upper portion of its wheel-supporting structure 78 about a fore-and-aft axis 102. As will be obvious, the linkage arrangement shown in FIG. 4 is functionally the same as illustrated in FIG. 2, already described. In this embodiment, however, the rods 92 terminate in upper ends 104 between which a shock absorber-spring assembly 106 extends. The assembly 106 is pivotally connected to each of the upper ends 104, as at 108. Whereas the spring assembly 58 of FIG. 2 includes a tension spring 60, the spring assembly 106 of FIG. 4 includes a compression spring 110. It is to be noted that the pivots 108 of FIG. 4 are on the same side of the axis 84 as the wheel to which that major link is connected, whereas in FIG. 2 the pivots 56 are each on the side of the pivot 44 opposite to the wheel to which the respective major links 36 are connected. This placement effects a reversal of the spring action.

Obviously, some means must be provided for preventing fore-and-aft movement or distortion of the wheel-supporting linkages described, under the influence of fore-and-aft forces commonly present in automotive vehicles. Such means are not shown herein since they will be obvious to those skilled in the art. For example, each wheel supporting structure could be connected to the vehicle frame by suitable fore-and-aft radius rods which are known in the art or the linkage structures themselves could be constructed to have a substantial fore-and-aft dimension sufficient to resist the distortion referred to. In the latter case, it would, of course, be necessary that the major fore-and-aft axes 18, 44, 68 or 84 be of substantial longitudinal extent and rigidity with multiple bearing points or elongated bearings between those axes and their corresponding major links.

While a limited number of specific embodiments of the invention has been described herein, the same are merely illustrative of the principles involved.

I claim:

1. A vehicle wheel suspension system for a vehicle having a frame, comprising:
   wheel-mounting members on opposite sides of said frame and having wheel-mounting axle means thereon;

pairs of upper and lower links having their outer ends pivoted, respectively, to upper and lower portions of said mounting members, about generally fore-and-aft axes, one of said upper and lower links of each pair comprising a major link;

each of said major links being mounted to said frame for pivotal movement about a common fore-and-aft major axis fixed relative to said frame generally centrally thereof;

each of said major links having pivot-defining means fixed thereon, vertically displaced from said major axis; and, each of the other of said links of each pair being pivoted at its inner end to the pivot defining means on the major link of the other pair.

2. A vehicle wheel suspension system as defined in claim 1 including spring means extending between corresponding portions of said major links and urging the outer ends of said major links to swing downwardly about said major axis.

3. A vehicle wheel suspension system as defined in claim 1 wherein said major links are the lower links of each pair, said pivot defining means being displaced upwardly from said major axis.